F. A. BALLOU, Jr.
SPRING RING.
APPLICATION FILED JUNE 5, 1919.
1,340,206. Patented May 18, 1920.
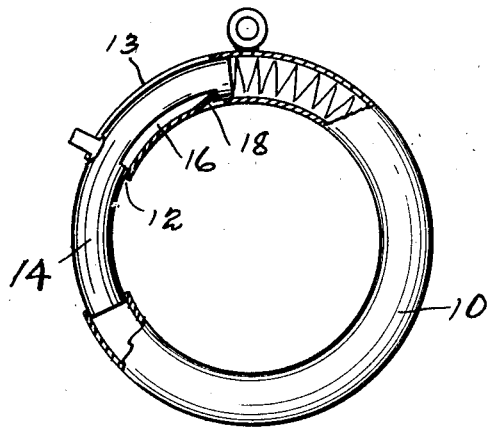
*Fig. 1*
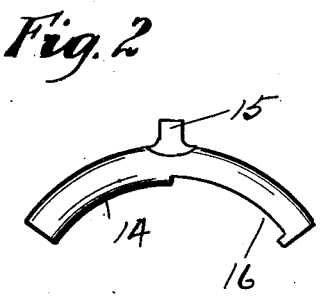
*Fig. 2*
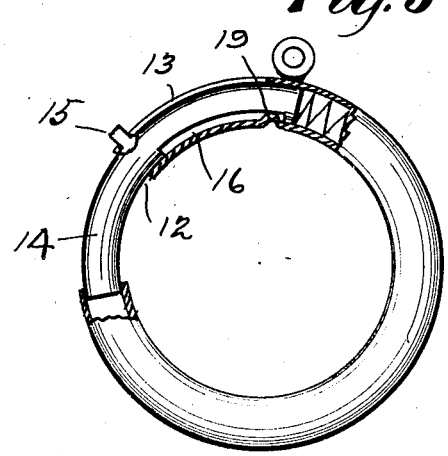
*Fig. 3*
*Fig. 4*
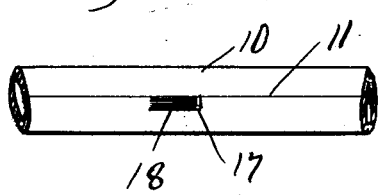
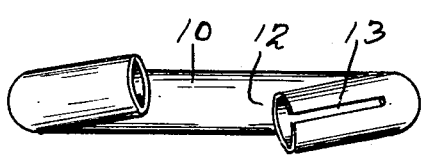
*Fig. 5*
Inventor
Frederick A. Ballou Jr.
By Howard E. Barlow
Attorney

UNITED STATES PATENT OFFICE.

FREDERICK A. BALLOU, JR., OF PROVIDENCE, RHODE ISLAND, ASSIGNOR TO B. A. BALLOU & CO., INC., OF PROVIDENCE, RHODE ISLAND, A CORPORATION OF RHODE ISLAND.

SPRING-RING.

1,340,206.   Specification of Letters Patent.   Patented May 18, 1920.

Application filed June 5, 1919. Serial No. 302,000.

*To all whom it may concern:*

Be it known that I, FREDERICK A. BALLOU, Jr., a citizen of the United States, and resident of the city of Providence, in the county of Providence and State of Rhode Island, have invented certain new and useful Improvements in Spring-Rings, of which the following is a specification.

This invention relates to spring rings of the class more particularly adapted for use as a connector for chains for personal wear, and has for its object to provide such a ring with a one-piece sliding bolt having an operating member formed integral therewith and to provide means whereby such a bolt may be readily positioned in the tubular portion and when so assembled prevented from coming apart even though the ends of the tubing may be bent out of alinement so that the free end of the bolt fails to enter its end of the tubing.

With these and other objects in view, the invention consists of certain novel features of construction, as will be more fully described, and particularly pointed out in the appended claims.

In the accompanying drawings:

Figure 1— is a sectional side elevation of my spring ring.

Fig. 2— is a side elevation showing a detail of the sliding bolt and its operating member as formed integral therewith.

Fig. 3— is a ring partially in section showing a modification of the stop for securing the bolt in the tubing.

Fig. 4— is a view of the under or inner side of the tubing showing the spring stop tongue as formed from the stock of the tubing.

Fig. 5— is an edge view of the ring showing the ends offset out of alinement with each other to facilitate the positioning of the bolt therein; also showing the open-ended guide slot in one end of the tubing.

Referring to the drawings, 10 designates the tubular ring member which, in some instances, is formed with a central seam 11 on its inner surface, see Fig. 4. The body portion of this tubular, ring-shaped member has a section removed as at 12, providing an entering mouth or opening into the ring and the outer wall at one end of the ring is provided with an open-ended guiding slot 13. The bolt or sliding member 14 of this device is provided with an operating, projecting member or handle 15 which is preferably formed integral therewith being swaged up out of the stock of the body of the bolt. This construction is found to be of special advantage particularly in the construction of very small rings. I have also scored the under side of this bolt as at 16 providing an elongated recess into which a portion of the stock of the tubular ring is preferably forced after the bolt has been positioned therein, to prevent accidental removal of the bolt from the tube after it has once been positioned in the tube.

One means of accomplishing this result is by slotting the inner wall of the ring as at 17, see Fig. 4, providing a spring tongue 18 from the stock which is bent inwardly and arranged to extend in a direction away from the adjacent end of the ring whereby the bolt is permitted to readily enter the tubing and in doing so cause the tongue to spring downwardly permitting the end of the bolt to pass and as soon as this end has passed the tongue the latter springs upward into the recess 16 and automatically locks the bolt in the tubing and prevents it from being again withdrawn therefrom. In other cases I simply force the stock inwardly as at 19 after the bolt has been inserted, thereby providing an inwardly-projecting protuberance which extends into the slot and serves as a stop to limit the outward sliding motion of the bolt.

My improved construction serves a number of useful purposes; first, by forming the bolt handle 15 integral therewith instead of forming it of a separate pin which often works loose and becomes lost and the provision of a permanent stop for retaining the bolt in the tubing, I avoid the possibility of permitting the bolt to be forced by the spring out of its tubing and becoming lost when the ends of the tubular ring are sprung out of alinement with each other which not only renders the ring useless but which would leave its mouth open and unguarded permitting it to become detached from the rest of the chain and so in some cases permit the loss of valuable jewels which the ring may have been positioned to retain; second, the parts may be very readily assembled as it is only necessary to offset one end of the tube slightly and slide the bolt therein, the operating member sliding into the open end of the guiding slot 13; third, by my automatic, inwardly-projecting spring tongue stop, when the bolt is positioned in the tubing it automatically becomes locked therein and even though the ends of the tubular member should be sprung out of alinement the effectiveness of the ring will not be destroyed as the bolt cannot be forced out of the tubing; and furthermore this stop limits the distance that the end of the bolt shall enter the opposite end of the tube.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A spring ring comprising a tubular ring-shaped body having a section removed providing an entering mouth, the wall at one end of the tube being slotted, a bolt slidably mounted in said ring to normally close said mouth, an operating member on said bolt slidable in said slot, said bolt being provided with a recessed portion, and a member on said tube extending into said recess to limit the sliding motion of the bolt.

2. A spring ring comprising a tubular ring-shaped body having an entering mouth, the wall at one end of the tube being provided with an open-ended slot, a spring-pressed bolt slidably mounted in said tube to normally close said mouth, an integral operating member on said bolt slidable in said slot, said bolt being provided with a recessed portion, and a spring tongue on said tube extending into said recess to limit the sliding motion of the bolt.

In testimony whereof I affix my signature.

FREDERICK A. BALLOU, Jr.